March 26, 1946.　　A. F. HICKMAN　　2,397,140
TRANSMISSION
Filed Oct. 28, 1943　　4 Sheets-Sheet 4
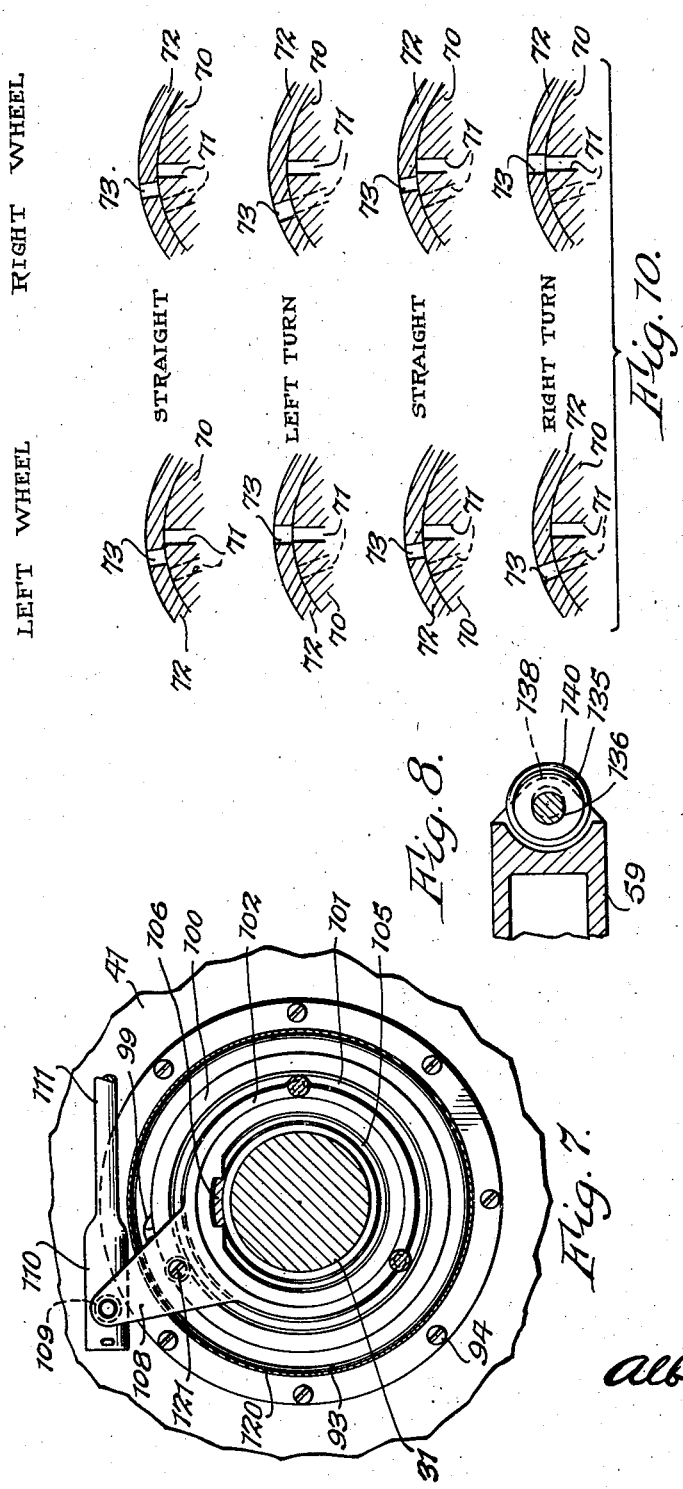
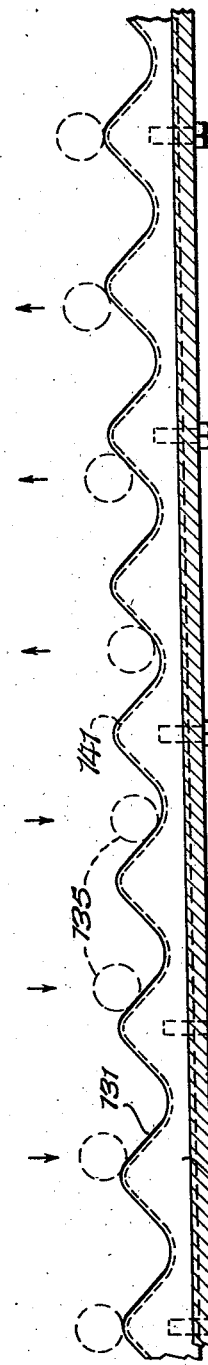
INVENTOR
Albert F. Hickman
BY Popp and Popp
ATTORNEYS Patented Mar. 26, 1946

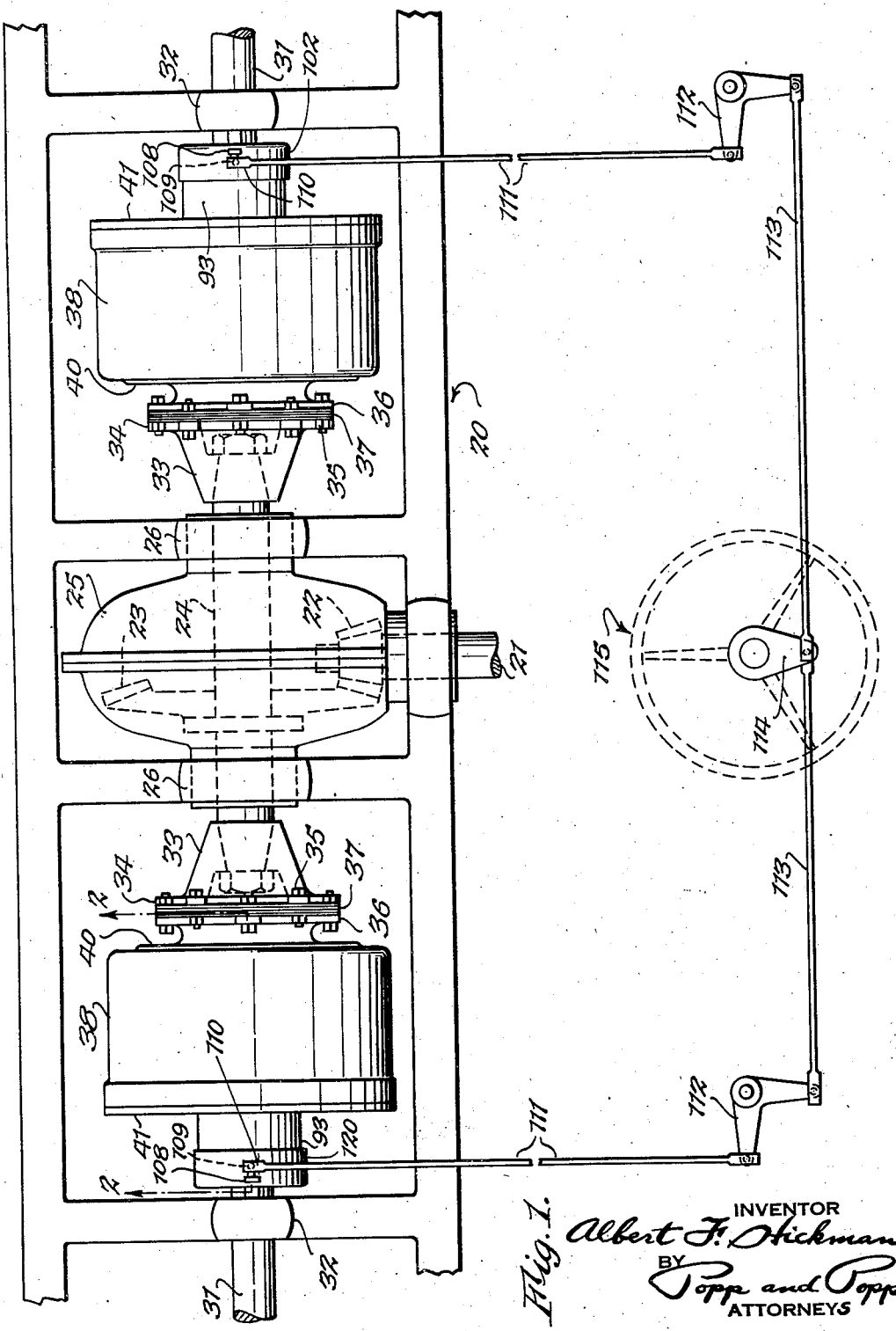

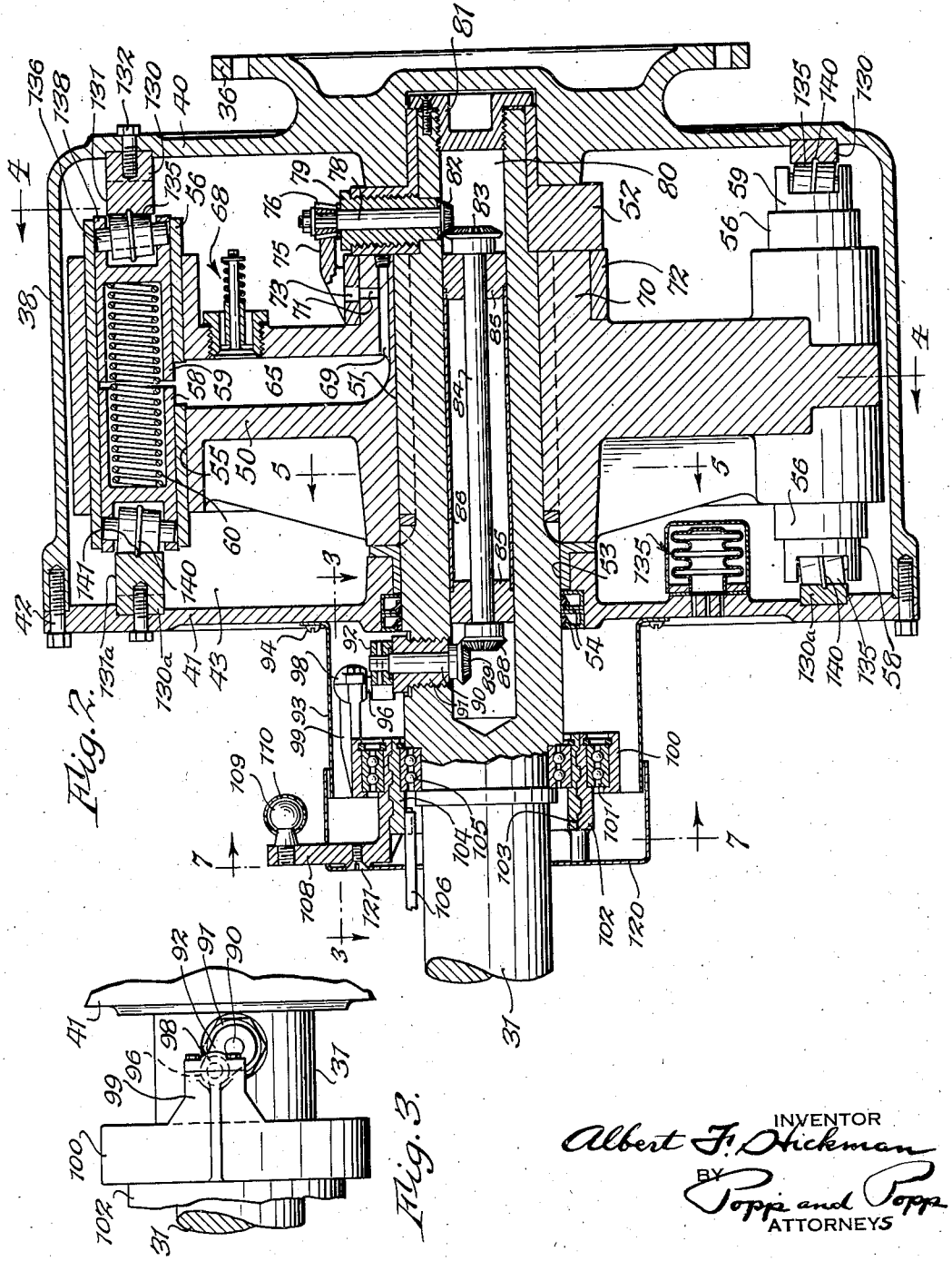

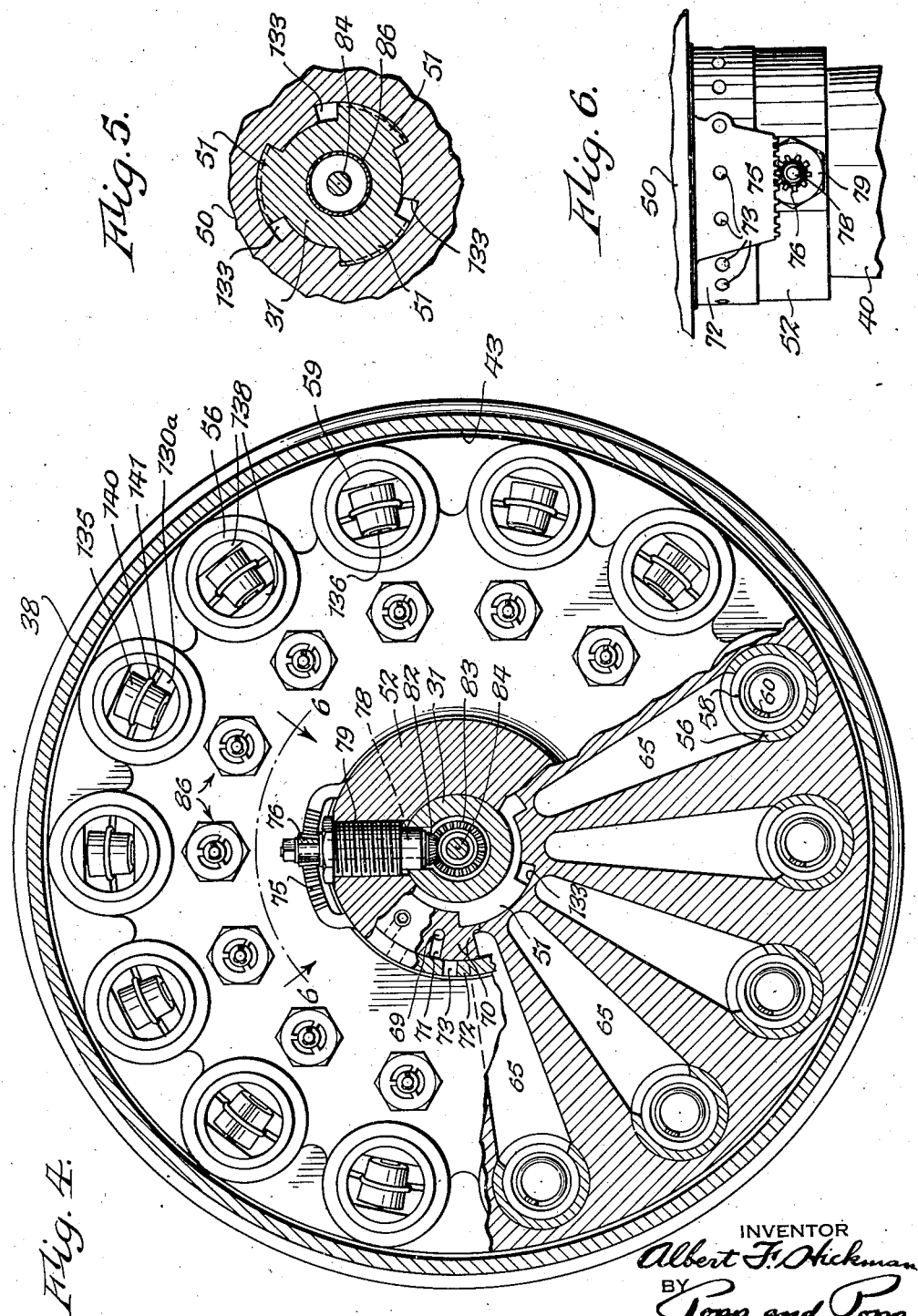

2,397,140

UNITED STATES PATENT OFFICE 2,397,140

TRANSMISSION

Albert F. Hickman, Eden, N. Y., assignor to Hickman Pneumatic Seat Co. Inc., Eden, N. Y., a corporation of New York Application October 28, 1943, Serial No. 508,012

9 Claims. (Cl. 180—17)

This invention relates to a transmission and is more particularly shown as embodied in a slow speed, heavy duty hydro-mechanical transmission for steering tractors, tanks and other heavy vehicles where it is desirable to effect steering by controlling the driving speeds of the driving traction wheels or treads at the opposite sides of the vehicle.

One of the principal objects of the invention is to provide such a heavy duty transmission which is capable of transmitting heavy loads without substantial slippage or power loss and which can be regulated to provide the amount of slippage necessary, for steering a tractor for example, without harm to the transmission and without a greatly increased power loss.

Another object of the invention is to provide such a transmission which is very sensitive in its adjustment and in which the adjustment can be effected with ease, thereby to provide effortless power steering when the transmission is used to steer tractors or like heavy vehicles.

Another object is to provide such a transmission which will stand up under conditions of severe and constant use without maintenance and service difficulties.

Another object is to provide such a hydromechanical transmission in which provision is made for compensating for the expansion and contraction of the driving fluid due to temperature changes.

Another object of the invention is to provide such a transmission in which adequate safety devices can be provided to protect the operating fluid seals against harm and to control the maximum torque that can be transmitted.

Another purpose is to provide such a transmission which is very compact in proportion to the power it is capable of transmitting.

Another object is to provide such a transmission in which all bearing loads, part stresses and pressures are well within safe limits.

Another object is to provide such a transmission in which there is a minimum loss of power when controlled slippage is permitted.

Another object is to provide, when the transmission is used in a steering mechanism, an automatic reversing mechanism which permits the manual control mechanism to be used in the same way both when moving forwardly and also when reverse torques are encountered as when reversing the vehicle or when coasting down a steep hill.

Other objects and advantages of the invention will appear from the following description and accompanying drawings, in which:

Fig. 8 is a fragmentary top plan view of a part of a power steering mechanism for a tractor embodying the present invention.

Fig. 2 is a fragmentary, enlarged, vertical section, through one of the transmissions, taken on line 2—2, Fig. 1.

Fig. 3 is a fragmentary plan view of a part of the transmission taken on line 3—3, Fig. 2.

Fig. 4 is a vertical sectional view through the transmission forming the subject of the invention, this section being taken on line 4—4, Fig. 2.

Fig. 5 is a fragmentary vertical section, taken on line 5—5, Fig. 2.

Fig. 6 is a top plan view of a part of the transmission, this view being taken on line 6—6, Fig. 4.

Fig. 7 is a fragmentary vertical section, taken on line 7—7, Fig. 2.

Fig. 8 is a fragmentary section through one of the pistons forming a part of the transmission and showing the manner in which its thrust roller is secured.

Fig. 9 is a developed section through the housing of the transmission and showing the circular cam track laid out in a straight line to illustrate the positions and action of the piston thrust rollers with reference to the salient portions of this circular cam track.

Fig. 10 is a view showing, in section, the different positions of the control valve rings of the transmissions when embodied in a power steering mechanism and in effecting the desired steered movement of the vehicle in any direction. The position of the ports 73 and passages 71 when forward torque is applied is illustrated by full lines and the position of the passages 71 when reverse torque is applied is illustrated by dotted lines.

The transmission is shown as embodied in a heavy duty, slow speed power steering mechanism for a tractor, tank or other heavy vehicle having a transmission carrying frame which is designated generally at 20 in Fig. 1. As shown in this figure, the vehicle has a propeller or main longitudinal drive shaft 21 which has a pinion 22 fast to its rear end, this pinion meshing with a ring gear 23 fast to an inner transverse drive shaft 24. The ring gear 23 and pinion 22 are shown as housed within a housing 25 from which the opposite ends of the inner transverse drive shaft 24 project outwardly, these opposite ends of this inner transverse drive shaft being journaled in bearings 26 on the frame 20. For this purpose, as best shown in Fig. 1, a conical hub 33 is secured to each end of the inner transverse drive shaft 24 in any suitable manner and has peripheral arms 34 which are secured by an annular series of attaching bolts 35 to flexible disks 37. These flexible disks 37 are secured by additional bolts to corresponding arms 36 of a drum-like housing 38 of the corresponding transmission 30 so as to provide a flexible coupling between the shaft 24 and each drum-like housing 38.

As best shown in Fig. 2, this drum-like housing 38 is provided with an integral closed end head 40 having an integral attaching flange 36 and the opposite end of the drum-like housing 38 is closed by an annular end head 41 which can be secured to the rim of the drum-like housing 38 by screws 42 or in any other suitable manner. The drum-like housing 38 and its removable end head 42 form a chamber 43 which is completely filled with oil or other suitable working liquid.

In this chamber 43 is arranged an anular cylinder block 50 which is splined, as indicated at 51, to the inner end of the corresponding axle 31, this axle being journaled in a bearing 52 in the integral end head 40 of the drum-like housing 38 and extending through a bearing 53 in the removable end head 41. Oil seals 54 are also preferably provided around the bearings 53. The cylinder block 50 is shown as having fifteen bores or cylinders 55 extending therethrough, these bores extending parallel with the axis of the corresponding axle 31 and being uniformly spaced about the periphery of the cylinder block 50.

In each of these bores or cylinders 55 is secured a sleeve 56 in which a pair of opposed pistons 58 and 59 operate. Each pair of pistons 58 and 59 is urged apart by a helical compression spring 60, this helical compression spring being preferably arranged in opposed bores provided in the pistons. These open opposing ends of each pair of pistons 58 and 59 communicate, through a central opening provided in the corresponding sleeve 56, with a chamber 65 provided in the cylinder block, each cylinder 55 and the corresponding pair of pistons 58 and 59 communicating with an individual chamber 65.

Each of these chambers 65 is provided with an inlet check or poppet valve 68, which can be of any suitable construction and which automatically opens and permits the flow of liquid from the main chamber 43 of the transmission into the corresponding chamber 65 when the companion pair of pistons 58 and 59 are forced outwardly by the spring 60 and thereby induce a suction in the chamber 65. When the pair of pistons move in a reverse direction, or toward each other, the liquid pressure built up in the corresponding chamber 65 closes the corresponding check or poppet valve and forces the liquid through a corresponding passage 69 leading axially into the cylindrical hub 70 at one side of the cylinder block 50. From this axial passage the liquid flows through a radial passage 71 to the cylindrical external face of the hub 70, this face carrying a valve ring 72. This valve ring 72 is rotatably fitted on the cylindrical external face of the hub 70 and is provided with a series of ports 73 which are arranged to be brought into register with the radial passages 71 as the valve ring is rotated. It will be seen that when the valve ring 72 is so rotated to a position, shown in Fig. 2, where the ports 73 register with the radial passages 71, the escape of liquid from the chamber 65 is permitted, and it will further be seen that the valve ring 72 can be rotated to throttle the escape of liquid to the main chamber 43.

To so rotate the valve ring 72, the valve ring is formed on one side to provide a segment 75 of crown gear teeth and, as best shown in Figs. 2 and 6, these crown gear teeth are engaged by a pinion 76 fast to a radial control shaft 78 which is shown as journalled in a screw plug 79. This screw plug extends through the corresponding side of the bearing 52 and axle 31 into a bore 80 provided at the inner end of the axle 41, the end of this bore being closed by a plug 81. Within the bore 80 of the axle, a bevel pinion 82 is fast to the radial control shaft 78, this bevel pinion meshing with a bevel gear 83 fast to a shaft 84. In order to maintain the shaft 84 concentric with the bore 80, it is shown as carried by a pair of cylindrical bearings 85 which are fitted in the bore 80 and are connected by a sleeve 86 which also fits the bore 80. A gear 88 is fast to the opposite end of the shaft 84 and meshes with a pinion 89 the hub 90 of which extends radially outward from the axle 31 through a screw plug 91 in which it is journaled.

A lever arm 92 is pinned to the outer end of the hub 90, this lever arm being arranged externally of the transmission housing and being arranged in a cylindrical sheet metal housing 93 which is secured at one end, as by screws 94, to the removable end head 41 of the transmission housing. At its outer end this lever arm 92 is formed to provide a stem and ball 96 which projects outwardly therefrom parallel with the axis of the lever arm and the ball is embraced by a socket 98 at the end of an arm 99, this arm being formed integrally with a ring 100 which embraces the corresponding part of the axle 31.

This ring is carried by the outer race of a ball bearing 101 the inner race of which is carried by an outer screw sleeve 102, the internal threads 103 of which engage corresponding external threads provided on an inner screw sleeve 104. This inner screw sleeve 104 is mounted on the outer race of a ball bearing 105, the inner race of which is secured to the corresponding axle 31 in any suitable manner. The axle is, of course, rotating and in order to hold the inner screw sleeve both against turning and also against axial movement, a rod 106 is shown as being secured to the inner screw sleeve 104, the other end of this rod being secured to the stationary frame in any suitable manner (not shown).

As best shown in Figs. 2 and 7, the screw sleeve 102 is provided with a radially projecting arm 108 which is shown as projecting inwardly or toward the center of the vehicle so that the two arms 108 on the opposite sides of the vehicle project in opposite directions as best shown in Fig. 1. Each of these arms 108 carries a ball 109 which is engaged by a socket member 110 at the rear end of a shipper rod 111. As best shown in Fig. 1, each shipper rod connects with one arm of a horizontally swinging bell crank 112 mounted on the frame of the vehicle and the other arm of this bell crank lever is connected by a shipper rod 113 with a lever arm 114 of the manual steering gear 115 of the vehicle. It will therefore be seen that the rotation of the valve ring 72 is under manual control of the steering gear 115 and that the valve rings 72 of the transmissions on opposite sides of the vehicle are rotated in opposite directions from one another by turning the manual steering gear 115 in one direction or the other.

In order to protect the control mechanism from dirt and corrosion, particularly the ball bearings 101 and 105, a cup-shaped sheet metal cap or guard 120 is shown as secured to the arm 102 by a screw 121, as best shown in Fig. 2, the rim of this guard being in closely spaced relation to the sheet metal sleeve 93 so as to enclose the control mechanism at the place where it enters each axle 31 and at the place where it changes from a mechanism mounted on a stationary part to a mechanism mounted on the rotating axle 31.

Mounted on the end head 40 of each drum-like transmission housing 38 is a ring 130 which has a series of undulating cams 131, these cams being shown as being sixteen in number, or one more than the number of bores 55 in the cylinder block 50. The cams project toward the cylinder block 50 and the ring 130 thereby provides an undulating cam track which opposes the corresponding pistons 59, the track being in axial alinement with the annular series of these pistons. Each ring 130 can be secured to the housing of the transmission in any suitable manner as by screws 132. A similar cam ring 130a is similarly mounted on the removable end head 41 of the transmission casing, this cam ring having a similar series of sixteen cams 131a opposing the corresponding annular series of pistons 58.

Each of the pistons 58, 59 carries a roller 135, each of these rollers being mounted on a pin 136 and these pins of each roller being carried by a pair of ears 138 provided at the outer end of each piston, as best shown in Figs. 2 and 8. These rollers 135 are preferably tapered and secured to the ears 138 of each piston at a corresponding angle and each roller preferably has a central annular outwardly projecting bead 140 which rides in a central groove 141 provided in the corresponding cam track 130 or 130a.

It will be noted that the three splines 51 which connect each cylinder block 50 with the corresponding axle 31 are formed integrally with the axle and are fitted in oversize keyways 133 provided in the cylinder block, as best shown in Fig. 4. That is, the keyways 133 are of greater circumferential extent than the keys 51 and the cylinder block 50 is thereby able to oscillate on the axle 31 the degree permitted by the oversize of these keyways. The purpose of this arrangement is to effect reversal of the valve mechanism when reverse torques are encountered, such as when the tractor is being reversed or when the tractor is going down a steep hill. When this obtains the cylinder block rotates from the position shown in Fig. 4 to the extent permitted by the oversize of the keyways 133. This oversize is such that the radial passages 71 of the hub 70 of the cylinder block travel to the opposite sides of the ports 73 of the valve ring 72. This occurs because the valve ring 72 rotates with the axle 31 in any adjusted position of the control gears and shafting connected with the valve ring.

A collapsible diaphragm unit, indicated at 135 in Fig. 2, has been shown as included to take care of the expansion and contraction of the working fluid due to temperature changes. It will also be understood that other safety devices, particularly overload safety devices, could be provided to prevent damaging forces from being built up.

In the operation of the transmission, when used as shown for steering a tractor or the like, when power is applied from the main longitudinal drive shaft 21 to the ring gear 23, the inner transverse drive shaft is rotated and since the two transmission housings are coupled with the opposite ends of this inner transverse drive shaft by the flanges 36 and couplings 33, the housings of the two transmissions are likewise rotated. When the transmission housings rotate relative to the cylinder blocks the axles 31 and the cylinder blocks 50 keyed thereto are stationary, the pistons 58 and 59 are reciprocated. The outward movement of these pistons is effected by the helical compression springs 60 housed therein and their inward movement is effected by the two cam rings 130 and 130a, these cam rings engaging the rollers 135 on the pistons and the salient faces 131 of these cam rings forcing each piston 58 and 59 inwardly each time the piston passes the same. Since sixteen salient cam faces are provided on each cam ring 135 or 135a, it will be seen that each piston reciprocates sixteen times on each rotation of the transmission housing relative to the assumed stationary axles 31 and cylinder blocks 50.

Each transmission housing is filled with light motor oil or other suitable liquid and it will be seen that as each opposing pair of pistons 58, 59 moves outwardly, or away from each other, oil from the housing will be drawn from the chamber 43 of the transmission housing, past the corresponding intake check or poppet valve 68 and into the corresponding chamber 65 of the cylinder block, this chamber communicating with the space or bore between the expanding pair of pistons. This intake of fluid to each chamber 65 is, of course, provided by the corresponding helical compression spring 60 which serves to expand the companion pair of pistons 58, 59 when the rollers travel beyond each cam face 131 and 131a.

When the pistons 58, 59 start to move in, they act to force the oil out of the cylinders and chambers 65, but since the check valve 68 close against any reverse flow of liquid, the liquid from the chambers 65 cannot escape past these check valves and can only escape from each chamber 65 through the corresponding axial passage 69, radial passage 71 and through the corresponding port 73 of the valve ring 72 back to the main chamber 43 of the transmission housing.

When the driver of the vehicle is steering straight ahead, the steering gear 115, and also the various shipper rods, bell crank levers, screw sleeves, shafts and bevel gears which connect this steering gear with the ring valves 72 of the two transmissions, are in a neutral or centralized position. In this neutral or centralized position of the steering gear and associated parts the ports 73 of the ring valves 72 of the transmissions on both sides of the vehicle are in the full line position shown at "straight" at the top of Fig. 10. That is, all of the ports 73 are out of register with the radial passages 71 leading to the chambers 65 and hence no liquid can escape from these chambers and the pistons 58, 59 are all locked against inward movement. Since the pistons cannot move inwardly, the rollers 135 are locked against movement, some of these rollers possibly being at the crests of the salients, but most of them engaging the sides of the salients as indicated diagrammatically in Fig. 9. Since the rollers 135 are locked against riding along these salients they are compelled to rotate with the salients and hence a direct drive is established, the cylinder blocks 50 rotating with the transmission housings and inner transverse drive shaft 24 and driving the axles 31 keyed thereto. Since the main drive shaft 21 has a direct drive connection with both axles 31, the vehicle will travel straight ahead.

When the driver desires to make a left turn, he swings the steering wheel 115 in a corresponding direction. This swings the lever 114 and shipper rods 113 to the right, as viewed in Fig. 1, and, through the bell crank levers 112, draws the shipper rods 111 forwardly. Referring to Fig. 2, this draws the arms 108 forwardly and rotates the screw sleeves 102 in a corresponding direction. Since the screw sleeves 102 at opposite sides of the vehicle are arranged in opposition to each other, that is, each projects inwardly from its arm 108, this movement of the lever arms 108 screws one screw sleeve 102 inwardly and the other screw sleeve outwardly on the corresponding stationary inner screw sleeve 104, these last inner screw sleeves being held stationary by the rods 106.

This axial movement of each of the outer screw sleeves 102, through the corresponding roller bearing 101 and ring 100, moves the arm 99 axially so as to rotate the lever arm 92 and the hub of the bevel gear 90 attached thereto. This rotates the bevel gear 88, shaft 84, beveled gears 83 and 82, radial shaft 78 and beveled pinion 76 so as to rotate the gear sector 75. Since, as best shown in Fig. 4, each gear segment or sector 76 is integral with the corresponding valve ring 72, the valve rings are turned. Because of the opposing relation of the screw sleeves 102, the valve ring 72 on one side of the vehicle is rotated in one direction while the valve ring 72 on the opposite side of the vehicle is rotated in the opposite direction. With the left turn position assumed, the valve ring 72 of the transmission for the left wheel is turned clockwise to bring its ports 73 into register with the radial passages 71 of the cylinder block 50 as viewed in the "left turn" position illustrated in Fig. 10 and the valve ring 72 of the transmission for the right wheel is turned counterclockwise, as viewed in the same figure so as to bring the valve ring ports 73 further out of register with the passages 71.

With this "left turn" position of the valve rings illustrated in Fig. 10, liquid cannot escape from the chambers 65 of the right hand transmission and hence the corresponding pistons 58, 59 are held against inward movement and the thrust rollers 135 remain locked in engagement with the salients of the cam rings 135, 135a. Hence a direct drive is maintained to the right wheel. However, in the transmission to the left wheel, the ports 73 of the valve ring 72 have been brought into register with the passages 71 of the cylinder block 50. Hence in the left hand transmission, fluid is free to escape from the chambers 65 through the passages 69 and 71 and ports 73 of the valve ring 72 back into the main chamber 43 of the left hand transmission. This releases the pistons 58, 59 of this left hand transmission to move inwardly and as the rollers 135 are no longer held locked in the position illustrated in Fig. 9, but are free to reciprocate with their pistons, slippage in the drive between the transmission housing and the cylinder block of the left hand transmission is provided. This slows up the left hand wheel or tread relative to the right hand wheel or tread so that the vehicle turns to the left.

In then turning to the right, the operator turns the steering gear 115 back to its original position, this restoring the two valve rings 72 to the original position assumed, this restoring both wheels to a direct drive connection with the main drive shaft as originally described. This position of the valve rings 72 is illustrated in the first and third pair of sectional views designated at "straight" in Fig. 10.

When the driver desires to make a right turn, he turns the steering gear 115 to the right. This effects a reversal of the movement of the parts from that just described in making a left turn. That is, the valve ring 72 of the left hand transmission, as illustrated at the bottom of Fig. 10, is moved counterclockwise so as to bring its ports 73 further out of register with the radial passages 71 of the corresponding cylinder block so that the escape of liquid from the corresponding chambers 65 is prevented and the pistons 58, 59 are locked against inward movement and their thrust rollers 135 locked in engagement with the cam rings 130, 130a. This maintains a direct drive between the main drive shaft 21 and the left hand wheel in the manner previously described.

With the steering gear 115 turned to the right, also as illustrated at the bottom of Fig. 10, the valve ring 72 of the right hand transmission is rotated clockwise so that its ports 73 are moved into register with the radial passages 71 of the cylinder block of the right hand transmission. As previously described in connection with the left hand transmission in left hand steering, this permits the oil to escape from the right hand cylinder block 50 thereby releasing the pistons 58, 59 for inward movement and releasing the locking engagement between the rollers 135 and cam rings 130, 130a of the right hand transmission. This provides a slipping drive between the main drive shaft 21 and the right hand wheel and since a direct drive is still maintained between the main drive shaft and the left hand wheel, the vehicle will steer to the right.

When reverse torque is carried by the transmissions, the conditions are reversed and hence the steering would likewise be reversed. Thus in going down steep grades the slipping left wheel (Fig. 10 second pair of sections) would cause a drag on the coupled right wheel which in turn would cause the vehicle to steer to the right. Hence the vehicle would steer to the left on "left turn" on the straight-away and to the right on going down a steep grade, a condition which would obviously be extremely bad. A similar condition would be encountered when backing the vehicle up.

To avoid this, means are provided for reversing the position of each of the valve rings 72 whenever the vehicle is backed up or its driving mechanism is subjected to a reverse torque as in going down a steep hill. When this occurs, each of the splines 51 of each axle (Fig. 4) moves from one extremity of its keyway 133 to the opposite extremity thereof. Thus the keyways 133 are made oversize so that in the "forward" drive, the axle is maintained in one position relative to its cylinder block 50 but when reversal takes place the axle and cylinder block 50 rotate relative to one another to another position. Since the valve rings 72 always rotate with the axle, it will be seen that this rotates the cylinder blocks relative to the valve rings 72 and hence changes the relation between the radial passages 71 in the hubs of the cylinder blocks and the ports 73 in the valve rings. The oversize of the keyways 133 is proportioned so that when going forward the passages 71 of the cylinder block and the ports 73 of the valve rings 72 occupy the relation shown by full lines in Fig. 10, and when reverse torque occurs, the cylinder block 50 rotates so that its radial passages 71 occupy the dotted line positions shown in Fig. 10.

Referring to Fig. 10, when the passages 71 are so moved to the dotted line positions shown under reverse torque conditions, it will be noted that their relation to the ports 73 of the valve rings 72 is exactly reversed. Thus in the "straight" steering positions the passages 71, in the dotted lines positions, are still out of register with the ports 73 but are on the opposite side thereof as compared to the full line position. Hence, when going straight ahead, either forwardly or rearwardly, a direct drive is maintained to all driving wheels.

Similarly on making a left turn in reverse, the port connections are reversed, the passages of the left hand transmission, as shown by dotted lines, second view left hand side in Fig. 10, being moved further out of register with the ports 73 and the passages 71 of the right hand transmission being moved into register with the ports 73 as shown by dotted lines in the companion right hand view. Hence, in reversing on a left turn the right hand wheel will slip so as to swing the rear of the vehicle to the left in the same manner normal to steering.

Similarly, on making a right hand turn in reverse (dotted lines, lowermost views, Fig. 10) the ports 73 of the left hand transmission are brought into register with the passages 71 whereas the passages 71 of the right hand transmission remain blocked. This permits the drive to the left hand wheel to slip and hence steer the vehicle in the usual direction.

From the foregoing it will be seen that the present invention provides a compact and powerful transmission which is very sensitive in its control and is readily adapted for use in a power steering mechanism for heavy tractors and the like. Further it operates with little power loss and when incorporated in a power steering mechanism is readily adapted for steering in the proper direction both when going forwardly or when the vehicle is put in reverse or subjected to reverse torque on going down a steep hill.

I claim as my invention:

1. A transmission for transmitting power between a rotary driving part and a substantially coaxial rotary driven part, comprising a cylinder block secured to rotate with one of said parts and having an annular series of axially extending cylinders, a piston in each of said cylinders, a bearing face at the outer end of each piston, a circular cam track arranged alongside said cylinder block and secured to rotate with the other of said parts, said cam track having at least one salient portion opposing said pistons and engaging said bearing faces of said corresponding pistons whereby the relative rotation of said cam track and cylinder block effects inward movement of said pistons, means for supplying an operating fluid to said cylinders, and valve means controlling the escape of said fluid from said cylinders thereby to vary the amount of power transmitted by said transmission, comprising a valve ring engaging an annular surface provided on said cylinder block and having a plurality of ports each associated with a corresponding cylinder, said cylinder block being provided with passages each connecting a corresponding cylinder with said annular surface and arranged to register with a corresponding one of said ports, and means for turning said valve ring to bring said ports into and out of register with said passages.

2. A transmission for transmitting power between a rotary driving part and a substantially coaxial rotary driven part, comprising a cylinder block secured to rotate with one of said parts and having an annular series of axially extending cylinders, a piston in each of said cylinders, a bearing face at the outer end of each piston, a circular cam track arranged alongside said cylinder block and secured to rotate with the other of said parts, said cam track having at least one salient portion opposing said pistons and engaging said bearing faces of said corresponding pistons whereby the relative rotation of said cam track and cylinder block effects inward movement of said pistons, means for supplying an operating fluid to said cylinders, and valve means controlling the escape of said fluid from said cylinders thereby to vary the amount of power transmitted by said transmission, comprising a hub on said cylinder block projecting axially therefrom and provided with an annular surface and a plurality of passages leading from said cylinders to said annular surface, a valve ring fitting said annular surface and having a plurality of ports corresponding to said passages and arranged to register therewith, and means for turning said valve ring to bring said ports into and out of register with said passages.

3. A transmission for transmitting power between a rotary driving part and a substantially coaxial rotary driven part, comprising a cylinder block secured to rotate with one of said parts and having an annular series of axially extending cylinders, a piston in each of said cylinders, a bearing face at the outer end of each piston, a circular cam track arranged alongside said cylinder block and secured to rotate with the other of said parts, said cam track having at least one salient portion opposing said pistons and engaging said bearing faces of said corresponding pistons whereby the relative rotation of said cam track and cylinder block effects inward movement of said pistons, means for supplying an operating fluid to said cylinders, and valve means controlling the escape of said fluid from said cylinders thereby to vary the amount of power transmitted by said transmission, comprising a valve ring engaging an annular surface provided on said cylinder block and having a plurality of ports each associated with a corresponding cylinder, said cylinder block being provided with passages each connecting a corresponding cylinder with said annular surface and arranged to register with a corresponding one of said ports, and means for turning said valve ring to bring said ports into and out of register with said passages, comprising gearing mounted to rotate with said one of said parts and operatively connected with said valve ring, a control member movably mounted on a stationary part, and means including a bearing concentric with said one of said parts and operatively connecting said control member and said gearing.

4. A transmission for transmitting power between a rotary driving part and a substantially coaxial rotary driven part, comprising a cylinder block secured to rotate with one of said parts and having an annular series of axially extending cylinders, a piston in each of said cylinders, a bearing face at the outer end of each piston, a circular cam track arranged alongside said cylinder block and secured to rotate with the other of said parts, said cam track having at least one salient portion opposing said pistons and engaging said bearing faces of said corresponding pistons whereby the relative rotation of said cam track and cylinder block effects inward movement of said pistons, means for supplying an operating fluid to said cylinders, and valve means controlling the escape of said fluid from said cylinders thereby to vary the amount of power transmitted by said transmission, comprising a valve ring engaging an annular surface provided on said cylinder block and having a plurality of ports each associated with a corresponding cylinder, said cylinder block being provided with passages each connecting a corresponding cylinder with said annular surface and arranged to register with a corresponding one of said ports, and means for turning said valve ring to bring said ports into and out of register with said passages, comprising a gear segment fast to said valve ring and concentric therewith, a pinion mounted to rotate with said one of said parts engaging said gear segment, and means for turning said pinion.

5. A transmission for transmitting power between a rotary driving part and a substantially coaxial rotary driven part, comprising a cylinder block secured to rotate with one of said parts and having an annular series of axially extending cylinders, a piston in each of said cylinders, a bearing face at the outer end of each piston, a circular cam track arranged alongside said cylinder block and secured to rotate with the other of said parts, said cam track having at least one salient portion opposing said pistons and engaging said bearing faces whereby the relative rotation of said cam track and cylinder block effects inward movement of said pistons, means for supplying an operating fluid to said cylinders, said cylinder block being provided with passages each leading from one of said cylinders to a valve seat, a valve member movably fitting said valve seat and having ports adapted to register with said passages, means for moving said valve member in one direction to move said ports into register with said passages, and means actuated by a reversal of the force transmitted by said transmission to rotate said valve member to a position where turning said valve member in said one direction moves said ports out of register with said passages.

6. A transmission for transmitting power between a rotary driving part and a substantially coaxial rotary driven part, comprising a cylinder block secured to rotate with one of said parts and having an annular series of axially extending cylinders, a piston in each of said cylinders, a bearing face at the outer end of each piston, a circular cam track arranged alongside said cylinder block and secured to rotate with the other of said parts, said cam track having at least one salient portion opposing said pistons and engaging said bearing faces of said corresponding pistons whereby the relative rotation of said cam track and cylinder block effects inward movement of said pistons, means for supplying an operating fluid to said cylinders, valve means controlling the escape of said fluid from said cylinders thereby to vary the amount of power transmitted by said transmission, comprising a valve ring engaging an annular surface provided on said cylinder block and having a plurality of ports each associated with a corresponding cylinder, said cylinder block being provided with passages each connecting a corresponding cylinder with said annular surface and arranged to register with a corresponding one of said ports, and means for turning said valve ring to bring said ports into and out of register with said passages, and means providing a loose connection between said valve ring and cylinder block to permit a predetermined limited rotative movement therebetween whereby upon a reversal of the force transmitted by said transmission the ports of said valve ring are moved into a different relation to said passages.

7. A transmission for transmitting power between a rotary driving shaft and a substantially coaxial rotary driven shaft, comprising a cylinder block mounted on one of said shafts, a key between said one of said shafts and said cylinder block and compelling them to rotate together but permitting a limited relative rotation therebetween on reversal of the transmission of power therebetween, said cylinder block having an annular series of axially extending cylinders, a piston in each of said cylinders, a bearing face at the outer end of each piston, a housing for said cylinder block secured to the other of said shafts and having sealed bearing engagement with said one of said shafts, a circular cam track secured to the inner face of one end head of said housing concentric with said shafts and having at least one salient portion projecting toward said cylinders, said cam track engaging said bearing faces whereby the relative rotation of said cam track and cylinder block effects inward movement of said pistons, check valve means in said cylinder block supplying an operating fluid from said housing to said cylinders, said cylinder block being provided with a plurality of passages each leading from a corresponding cylinder to an external annular valve seat arranged concentric with the axis of rotation, a ring fitted against said valve seat and having a plurality of ports arranged to register with said passages and permit the escape of said fluid therefrom into said housing, and control means mounted on said one of said shafts for rotating said valve ring relative to said cylinder block to control the escape of fluid from said passages, said control means compelling said valve ring to rotate with said one of said shafts whereby upon a reversal of the force transmitted by said transmission, the relative movement between said one of said shafts and said cylinder block provided by said key effects a relative movement between said cylinder block and valve ring to reverse the relation between said ports and passages.

8. A hydraulic steering mechanism between the main drive shaft of a vehicle and its axle shafts, comprising a transmission between said main drive shaft and each of said axle shafts and each including a cylinder block secured to rotate with one of said shafts and having an annular series of axially extending cylinders, a piston in each of said cylinders, a bearing face at the outer end of each piston, a circular cam track arranged alongside said cylinder block and secured to rotate with the other of said shafts, said cam track having at least one salient portion opposing said pistons and engaging said bearing faces of said pistons whereby the relative rotation of said cam track and cylinder block effects inward movement of said pistons, means for supplying an operating fluid to said cylinder and valve means controlling the escape of said fluid from said cylinders thereby to vary the amount of power transmitted by said transmission, comprising a valve ring engaging an annular surface provided on said cylinder block and having a plurality of ports each associated with a corresponding cylinder, said cylinder block being provided with passages each connecting a corresponding cylinder with said annular surface and arranged to register with a corresponding one of said ports, and means for turning said valve ring to bring said ports into and out of register with said passages, a steering gear on said vehicle, and means operatively connecting said steering gear with said means for turning said valve ring of each transmission whereby upon movement of said steering gear in either direction the discharge of fluid from the cylinders of one of said transmissions is effected to permit the cam track and cylinder block of said last transmission to slip relative to each other and effect steering of said vehicle.

9. A hydraulic steering mechanism between the main drive shaft of a vehicle and its axle shafts, comprising a transmission between said main drive shaft and each of said axle shafts and each including a cylinder block secured to rotate with one of said shafts and having an annular series of axially extending cylinders, a piston in each of said cylinders, a bearing face at the outer end of each piston, a circular cam track arranged alongside said cylinder block and secured to rotate with the other of said shafts, said cam track having at least one salient portion opposing said pistons and engaging said bearing faces whereby the relative rotation of said cam track and cylinder block effects inward movement of said pistons, means for supplying an operating fluid to said cylinders, said cylinder block being provided with passages each leading from one of said cylinders to a valve seat, a valve member movably fitting said valve seat and having ports adapted to register with said passages, means for moving said valve member in one direction to move said ports into register with said passages, and means actuated by a reversal of the force transmitted by said transmission to rotate said valve member to a position where turning said valve member in said one direction moves said ports out of register with said passages, a steering gear on said vehicle, and means operatively connecting said steering gear with said valve member moving means of each transmission whereby upon movement of said steering gear in either direction the discharge of fluid from the cylinders of one of said transmissions is effected to permit the cam track and cylinder block of said last transmission to slip relative to each other and effect steering of said vehicle.

ALBERT F. HICKMAN.